US009092409B2

(12) United States Patent (10) Patent No.: US 9,092,409 B2
Charaniya et al. (45) Date of Patent: Jul. 28, 2015

(54) SMART SCORING AND FILTERING OF USER-ANNOTATED GEOCODED DATASETS

(75) Inventors: Amin Charaniya, Milpitas, CA (US); Michael T. Jones, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 1277 days.

(21) Appl. No.: 12/251,057

(22) Filed: Oct. 14, 2008

(65) Prior Publication Data

US 2015/0169523 A1    Jun. 18, 2015

Related U.S. Application Data

(60) Provisional application No. 60/960,737, filed on Oct. 11, 2007.

(51) Int. Cl.
*G06F 7/00* (2006.01)
*G06F 17/00* (2006.01)
*G06F 17/24* (2006.01)
*G06F 17/30* (2006.01)

(52) U.S. Cl.
CPC ........ *G06F 17/241* (2013.01); *G06F 17/30663* (2013.01)

(58) Field of Classification Search
USPC .......................................... 707/743, 999.003
See application file for complete search history.

(56) References Cited

U.S. PATENT DOCUMENTS

| 2007/0011150 | A1* | 1/2007 | Frank ................................. 707/4 |
| 2007/0258642 | A1* | 11/2007 | Thota ............................ 382/173 |
| 2008/0086468 | A1* | 4/2008 | Jing et al. .......................... 707/5 |
| 2009/0049408 | A1* | 2/2009 | Naaman et al. ............... 715/835 |

OTHER PUBLICATIONS

Applewhite, Amenity. "Farm 2.0: Using Wordpress to Manage Geocontent and Promote Regional Food Products" *Geospatial Technologies*, Mar. 2009; 47 pages.

Kwan, M.P., "Interactive Geovisualization of Activity-Travel Patterns Using Three-Dimensional Geographical Information Systems: A Methodological Exploration with a Large Data Set," *Transportation Research Part C: Emerging Technologies*, Feb. 2000; pp. 185-203.

Konigsberg, S., et al., "The Geospatial Distribution of Employment: Examples from the Bureau of Labor Statistics Quarterly Census of Employment and Wages Program," *Division of Administrative Statistics and Labor Turnover—Office of Employment and Unemployment Statistics—Bureau of Labor Statistics*, Published in 2005; 9 pages.

\* cited by examiner

*Primary Examiner* — Kimberly Wilson
(74) *Attorney, Agent, or Firm* — Fish & Richardson P.C.

(57) ABSTRACT

A geographic information system and method that facilitate the display of user-annotated datasets. The dataset can include data such as user-generated videos, photos, blogs, etc., and is processed to search for geo-annotations. The geo-annotations and other data signals are utilized by a scorer to determine a level-of-detail for the particular data. The level-of-detail provided by the scorer is utilized by the geographic information system to determine which data to display as a user navigates around a map.

24 Claims, 8 Drawing Sheets

SMART SCORING AND FILTERING OF USER-ANNOTATED GEOCODED DATASETS

This application claims the benefit of U.S. Provisional Application No. 60/960,737, filed on Oct. 11, 2007, which is incorporated herein by reference in its entirety.

BACKGROUND OF THE INVENTION

1. Field of the Invention

The present invention relates to geographic information systems and interfaces for displaying geocoded datasets.

2. Background Art

Modern geographic information systems such as Google Earth enable the sophisticated display and analysis of geocoded data. Nevertheless, it remains a challenge to process datasets of information to extract useful geocode information and to present the data in a usable interface. For example, extracted data may not be particularly useful. It may lack detail, and may therefore be of little value to a user. In addition, the available information may be misleading. Geo-annotations, for example, may appear to be germane to the related geographical location, but may in fact be irrelevant. A reference to "freedom" may relate to Freedom Plaza in Washington D.C., and could therefore be useful information. But it may alternatively relate to the abstract concept of freedom, which could be irrelevant for geo-annotation purposes.

Therefore a system and method for processing geocoded data is needed, where the extracted information is sufficiently detailed to be useful, and where extraneous information is eliminated.

BRIEF DESCRIPTION OF THE DRAWINGS/FIGURES

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and application.

The following describes a geographic information system and method that facilitate the display of user-annotated datasets. The dataset, for example, can include elements such as user-generated videos, photos, blogs, etc., and is processed to search for geo-annotations. The geo-annotations and other data are utilized by a scorer to determine a geographic level-of-detail for the particular data. The level-of-detail provided by the scorer is utilized by the geographic information system to determine which data to display as a user navigates around a map.

Figure 1:
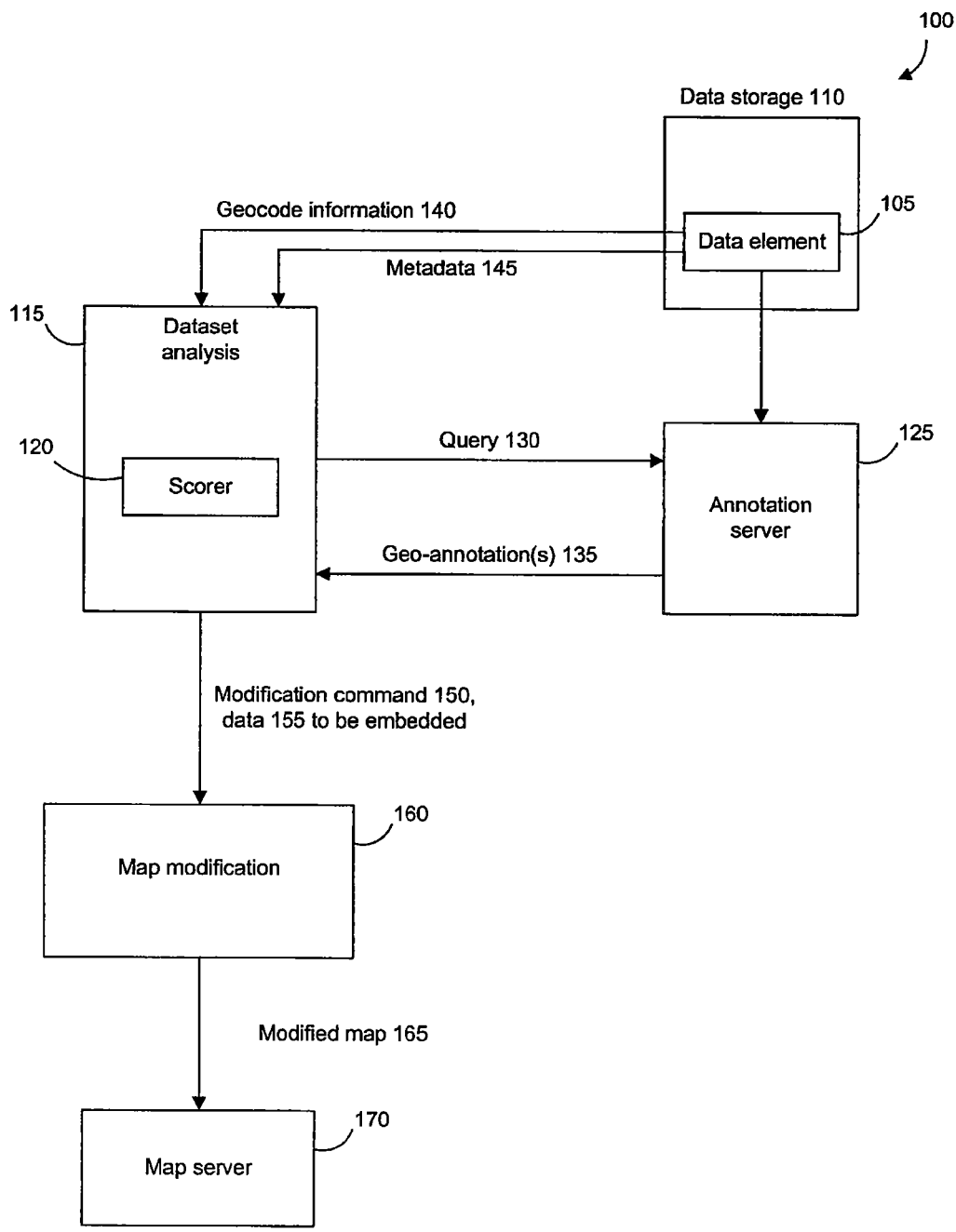
FIG. 1 is an illustrative display of a geographic information system configured in accordance with an embodiment of the invention.

FIG. 1 illustrates a system 100 that represents an embodiment of the invention. Data sets, including data element 105, are stored in a data storage system 110. Data element 105 represents information posted by a user with respect to some geographic location of interest. Data element 105 may include text information (e.g., from the user's blog), one or more photographs, or one or more video files, or may comprise links to such content. In an embodiment of the invention, a data element contains one or more links to video hosted by YouTube. In an alternative embodiment, the data element contains one or more links to video hosted by another service.

Data storage system 110 may be organized as a database, or otherwise structured to allow access to the various data elements. System 100 also includes a data set analysis module 115. Data set analysis module 115 includes a scorer 120. As will be discussed in greater detail below, data set analysis module 115 receives information relating to the data elements. This information is then used by scorer 120 to create a score corresponding to the level-of-detail available in any given data element 105.

One example of such information is geocode information 140. If, for example, data set 105 includes a photograph, the photograph may have associated information regarding where the photograph was taken. Such location information represents a form of geocode information 140. An example of such geocode information 140 is the latitude and longitude coordinates of a location. Geocode information 140 can also include an altitude coordinate.

There may also be metadata 145 associated with data set 105. Examples of metadata 145 include the number of times information in data set 105 has been viewed on-line, or a user ranking of information presented in data set 105. Both geocode information 140 and metadata 145 may be used by scorer 120 to generate a level-of-detail score.

In addition, the user who posted data set 105 may have made annotations in textual form that become part of data set 105. These geo-annotations 135 are also used by scorer 120 in formulating a level-of-detail score. In an embodiment of the invention, geo-annotations 135 are accessed through an annotation server 125. In the illustrated embodiment, data set 105 is first accessed by annotation server 125. The data set analysis processor 115 then queries annotation server 125, using a query message 130. Alternatively, the query 130 may precede the access by server 125 of data element 105. In any event, in response to query 130, annotation server 125 presents geo-annotations 135 back to data set analysis processor 115.

Once the available data is presented to scorer 120, a level-of-detail scorer is generated. If the level-of-detail of scorer is above a certain threshold, then a modification to a map will be made. In the illustrated embodiment, data set analysis module 115 sends a modification command 150 to a map modification module 160. The modification comprises information drawn from data set 105 and embedded in a map. The data to be embedded in the map is shown as data 155. Using data 155, map modification module 160 generates a modified map 165. The modified map can then be stored in a memory device, where it can be made available to users. In the illustrated embodiment, the memory device is part of a map server 170. An example of a modified map will be discussed below.

Note that in alternative embodiments of the invention, any subset of the components shown in FIG. 1 may in fact be embodied as a single component. For example, the functionality of dataset analysis module 115 and map modification module 160 may be combined in a single device or module. Likewise, data storage 110 and annotation server 125 may be implemented as a single component. Other combinations of the functional components of FIG. 1 are also possible, as would be known to a person of skill in the art.

In addition, the processing of the components of FIG. 1 may be implemented in software, firmware, hardware, or in any combination thereof. Dataset analysis module 115 and scorer 120 may therefore be implemented as software executing on one or more computing devices, as will be described in greater detail below. Implementations using programmable hardware may use any commercially available and well known computer capable of performing the functions described herein, such as computers available from Sony, Apple, Silicon Graphics Inc., Sun, HP, Dell, Compaq, Cray, etc. Likewise, map modification module 160 may be implemented as software executing on one or more computing devices.

Moreover, the communications between any of the components of FIG. 1 may take place over any communications infrastructure known to persons of skill in the art. Such infrastructure may include, without limitation, dedicated channels or switched networks, implemented using cable, fiber, or wireless communications media.

Figure 2:
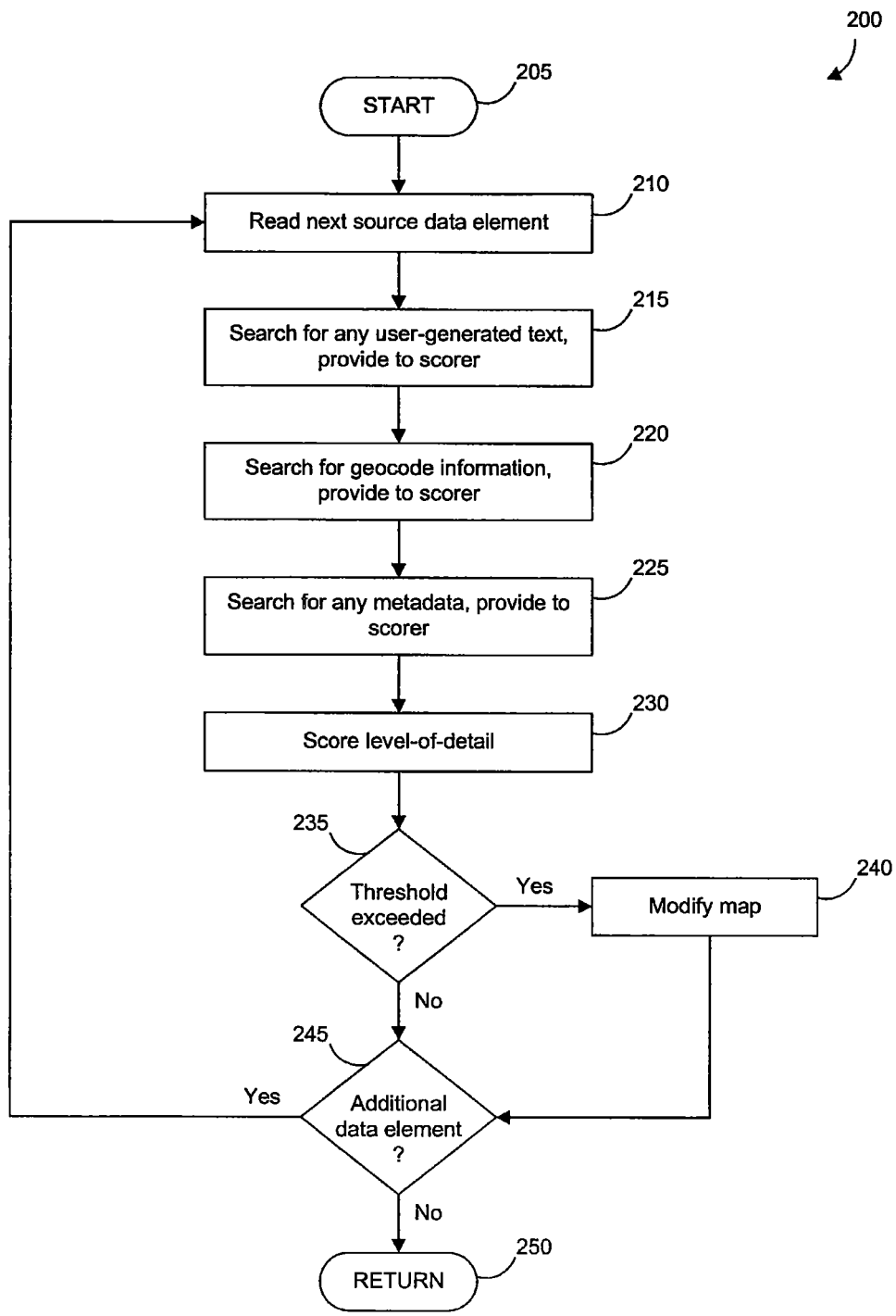
FIG. 2 is a flowchart illustrating the processing of a data element, information from which can be displayed on a map image, in accordance with an embodiment of the invention.

The processing of an embodiment of the invention is illustrated in FIG. 2. The process begins at stage 205. In stage 210, a source data element is read. In an embodiment of the invention, this stage is performed by data set analysis processor 115, as shown in FIG. 1 above, and results in the dataset analysis processor 115 receiving geocode information 140 and metadata 145, if either are present.

In stage 215, a search is performed for any user generated text. As described above, this can be performed by querying an annotation server 125 in an embodiment of the invention. This information is then provided to the scorer, if such text is present. In stage 220, the data element is searched for any geocode information. This information is likewise provided to the scorer. In stage 225, the data element is searched for any metadata, which is then provided to the scorer. In stage 230, a score is derived indicating the level-of-detail present in the data element. As discussed above, this can be performed by scorer 120.

The score can be a function of any of several possible conditions. For example, any of the following may be considered in generating a score. Each item below is accompanied by a description of the impact of the item on the score.

1. place name mention in the text/description, which improves the level-of-detail;

2. proximity of the mentioned place name (if any) to a user-provided location, where greater proximity suggests greater precision, less ambiguity, and a greater level-of-detail;

3. number of page views of information in the data element, which implies a high degree of usefulness and a useful level-of-detail;

4. user-provided ratings, where higher ratings again imply a high degree of usefulness and a useful level-of-detail;

5. number of user comments, where more comments suggest usefulness and a therefore a significant level-of-detail;

6. number of characters in a title and/or description, where a longer description implies greater detail; and 7. date when the content (i.e., the element) was uploaded, where an older upload suggests that the information is useful and detailed, given that the information has remained available (and has not been deleted) for a relatively long period.

In an embodiment of the invention, the scoring function can therefore be any function where the output (i.e., the score) increases if a place name is mentioned (condition 1), if the mentioned place name is closer to a user-provided location (2), if the number of page views is great (3), if user-provided ratings are high (4), if the number of comments is high (5), if the description is long (6), or if the content has been uploaded for a long time (7). Analogously, the scoring function can be any function where the score decreases if a place name is not mentioned (condition 1), if the mentioned place name is distant from a user-provided location (2), if the number of page views is low (3), if user-provided ratings are low (4), if the number of comments is low (5), if the description is brief (6), or if the content has only been uploaded recently (7).

In an alternative embodiment of the invention, the level-of-detail score is a function of the first two conditions. Where users accidentally or intentionally annotate entities with unrelated place names in the associated description, the scorer can de-emphasize the importance of the first factor. Over time the emphasis of place names may be reduced, as more users may be inclined to geo-tag their content (e.g., videos) and better quality content may appear.

Once a score has been generated, the score is compared to a predetermined threshold; a determination as to whether the threshold is exceeded by the score is performed in stage 235. Exceeding the threshold implies that the level-of-detail is relatively high. A reference to the associated data element can therefore be included on maps of a region that includes the location associated with the data element. If the threshold is exceeded, the process continues at stage 240. Here, the map containing the location is modified. The map is modified to include a reference to the data element, where the reference is placed at the location corresponding to the data element. In an embodiment of the invention, the reference can be an icon that can be clicked by a user, such that clicking on the icon results in presenting the data element's content to the user. Here, the icon can be viewed as a link to this content. One method of determining the placement of such icons using the level-of-detail is described in U.S. Provisional patent application Ser. No. 12/129,501, filed on May 29, 2008, and entitled "Browsing Large Geocoded Datasets Using Nested Shapes," which is incorporated herein by reference in its entirety.

If, in stage 235, the threshold is not exceeded by the generated score, then the process continues at stage 245. Here, a determination is made as to whether another data element is present. If so, then the process returns to stage 210, where the next data element is read. Otherwise, the process concludes at stage 250.

Figure 3:
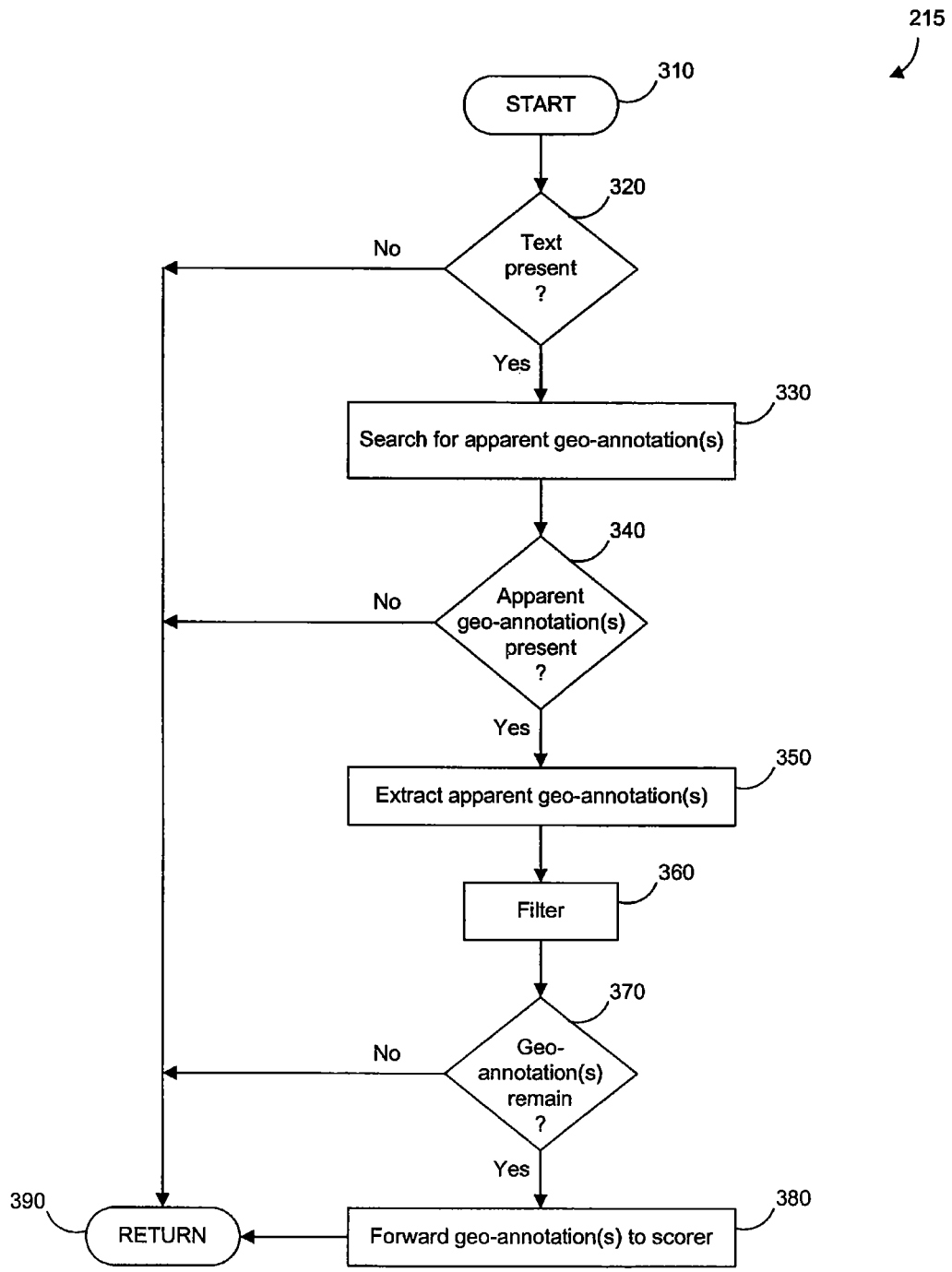
FIG. 3 is a flowchart illustrating the process of searching user-generated text from a data element, in accordance with an embodiment of the invention.

Stage 215, the search for user generated text in the data element, is illustrated in greater detail in FIG. 3, according to an embodiment of the invention. The process begins at stage 310. In stage 320, a determination is made as to whether any text is present. If so, then the process continues at stage 330. Here, the text is searched for any apparent geo-annotations. A segment of text may be considered an apparent geo-annotation for any of several reasons. If the text is found in a dictionary of place names, for example, it may be treated as an apparent geo-annotation. If the text appears to follow a certain format, it may also be treated as an apparent geo-annotation. Examples of such a format may be a mailing address, or a longitude and latitude reference.

In stage 340, a decision is made as to whether apparent geo-annotations were revealed in the search. If so, then the process continues at stage 350. Here, any apparent geo-annotations are extracted. In stage 360, a filtering process is applied to the extracted apparent geo-annotations. Filter process 360 serves to eliminate apparent geo-annotations that are in fact not geographic annotations. This may include, for example, references that are not genuinely place names. One example might be a reference to Washington, the president, as opposed to Washington, the city. Such a reference would be eliminated in the filtering process. In an embodiment of the invention, filtering is performed on the basis of analyzing the context of the identified text. Known techniques of natural language processing may be used in the filtering process, as would be known to persons of skill in the art. In stage 370, the determination is made as to whether geo-annotations remain after a filtering stage 360. If so, then the remaining geo-annotations are forwarded to the scorer in stage 380. The process concludes at stage 390.

Figure 4:
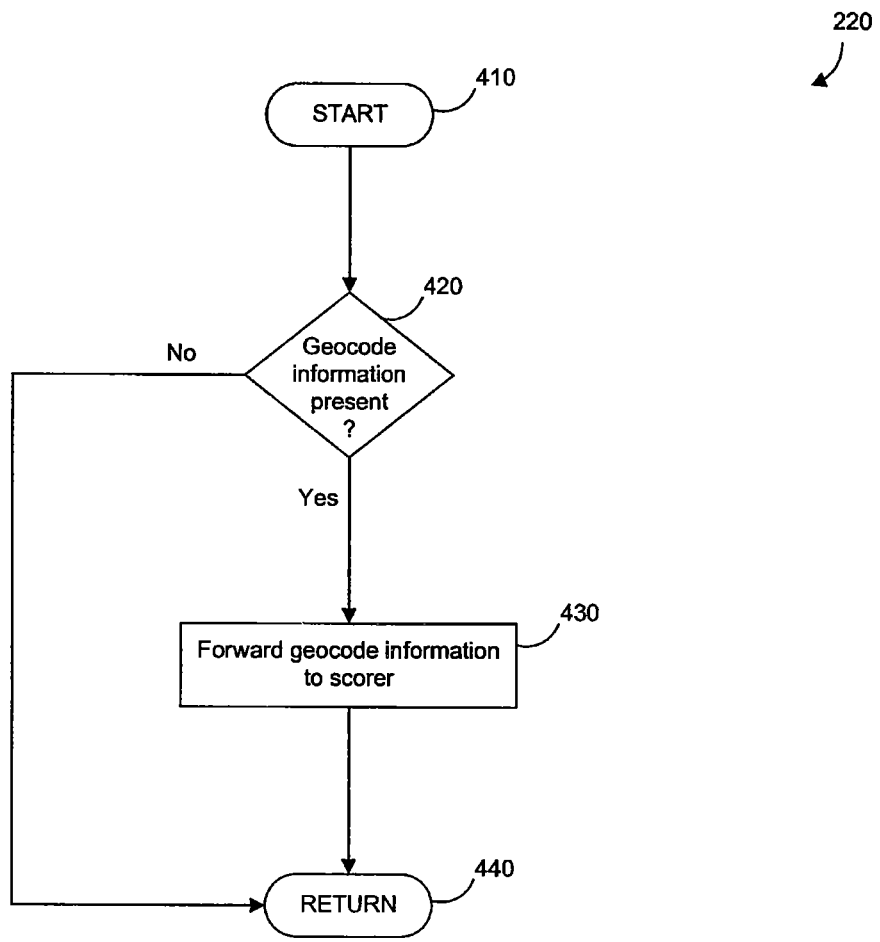
FIG. 4 is a flowchart illustrating the process of searching for geocode information from a data element, according to an embodiment of the invention.

At stage 220, the search for geocode information in the data element, is illustrated in greater detail in FIG. 4 according to an embodiment of the invention. The process begins at stage 410. In stage 420, a determination is made as to whether geocode information is present in the data element. If so, then the process continues at stage 430. Here, any identified geocode information is forwarded to the scorer. The process concludes at stage 440.

Figure 5:
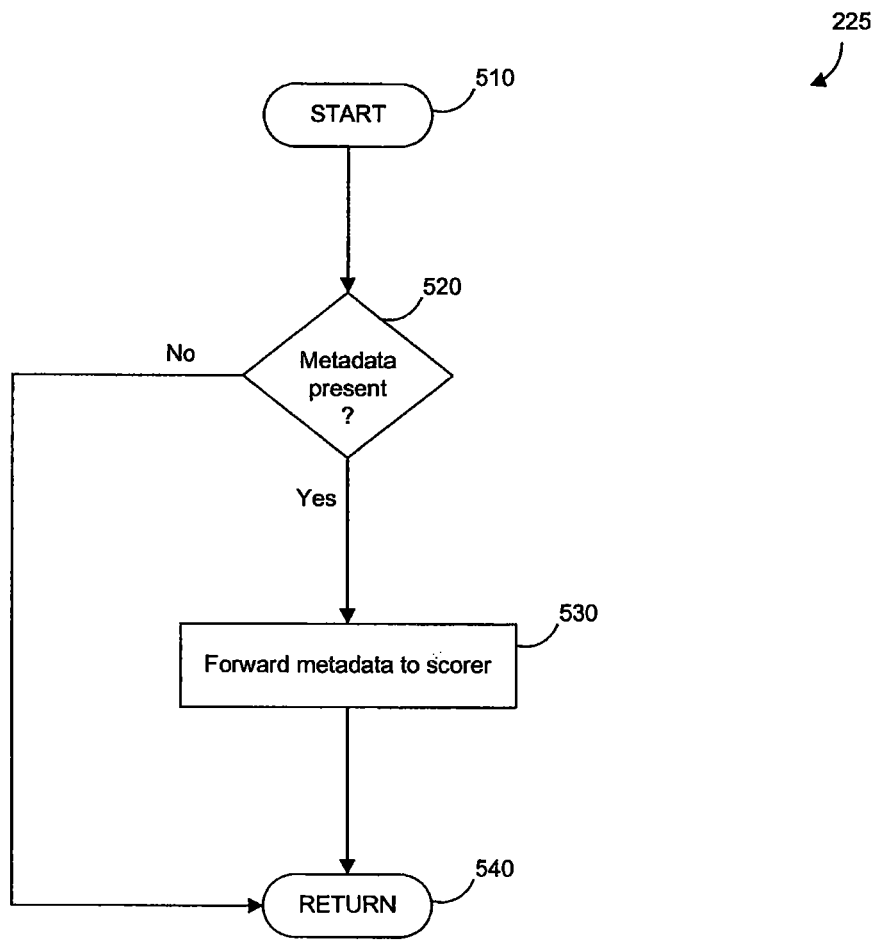
FIG. 5 is a flowchart illustrating the process of searching a data element for metadata, according to an embodiment of the invention.

Stage 225, the search for any metadata, is illustrated in greater detail in FIG. 5 according to an embodiment of the invention. The process begins at stage 510. In stage 520, a determination is made as to whether any metadata is present in the data element. If so, the metadata is forwarded to the scorer in stage 530. The process concludes at step 540.

Figure 6:
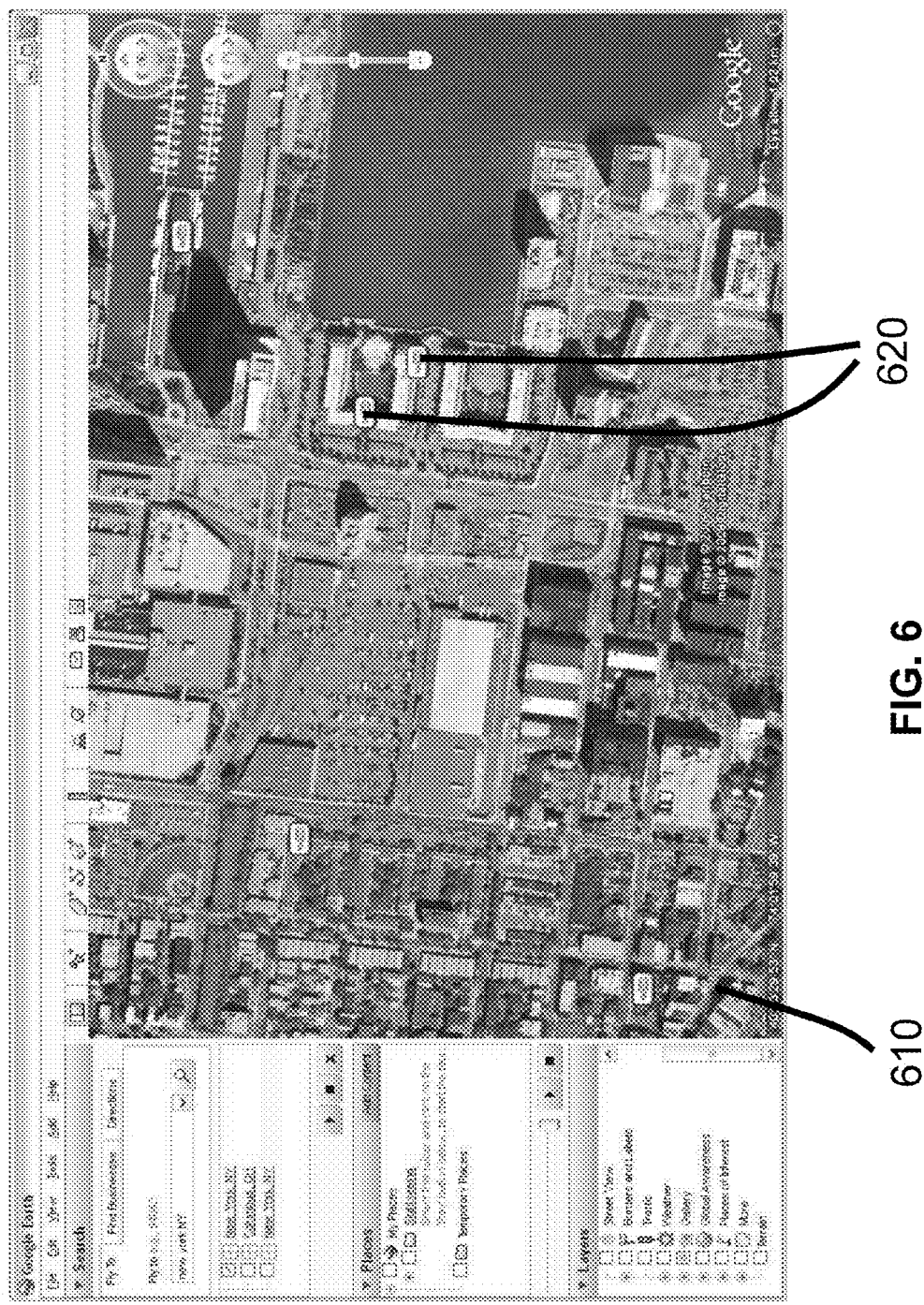
FIG. 6 illustrates the presentation of a map to a user, where the map has been modified to include references to particular locations and where the references correspond to data elements, according to an embodiment of the invention.

An example of a map modified according to an embodiment of the invention is illustrated in FIG. 6. A map 610 has been modified to include a plurality of icons 620. Each icon corresponds to a location associated with a data element whose level-of-detail score has exceeded a threshold. In an embodiment of the invention, a user can click on one of the icons to access information from the data element. This may include, for example, photographs, blog entries, or video.

Figure 7:
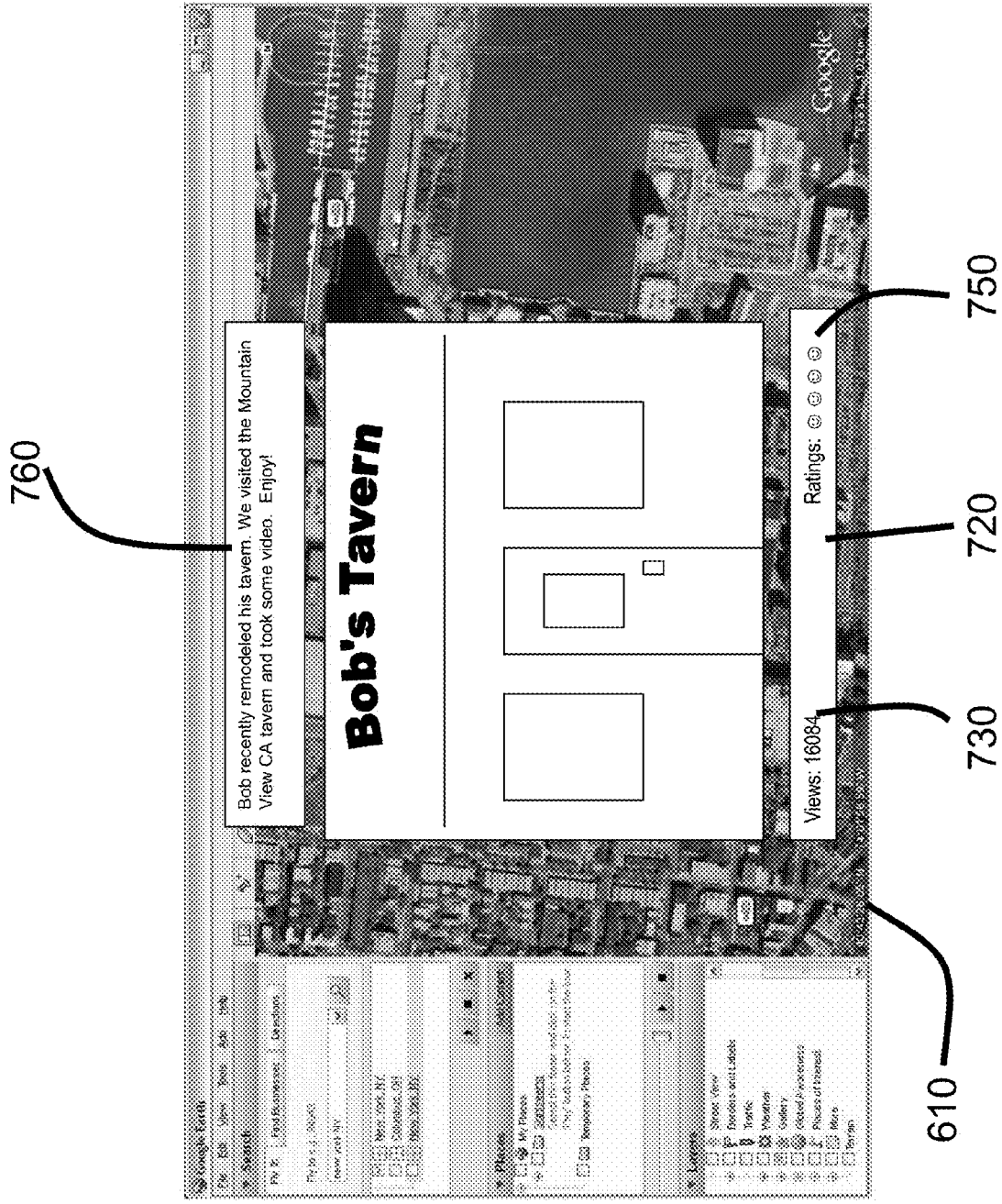
FIG. 7 illustrates the presentation of data from a data element, according to an embodiment of the invention.

An example of what happens when a user clicks on such an icon is illustrated in FIG. 7. Here, clicking on the icon opens a segment of video. This is viewable through window 720. Note that the window 720 also includes the number of views 730 and a user rating 750. These latter pieces of information would have been received as metadata by the scorer and used to determine a level-of-detail score. In addition, a block 760 of user-generated text is also presented in window 720. Such text would have been considered by the dataset analysis processor in order to identify any geo-annotations. In this case, the reference to Mountain View Calif. would have been identified as an apparent geo-annotation, then subjected to the filtering process discussed above.

Figure 8:
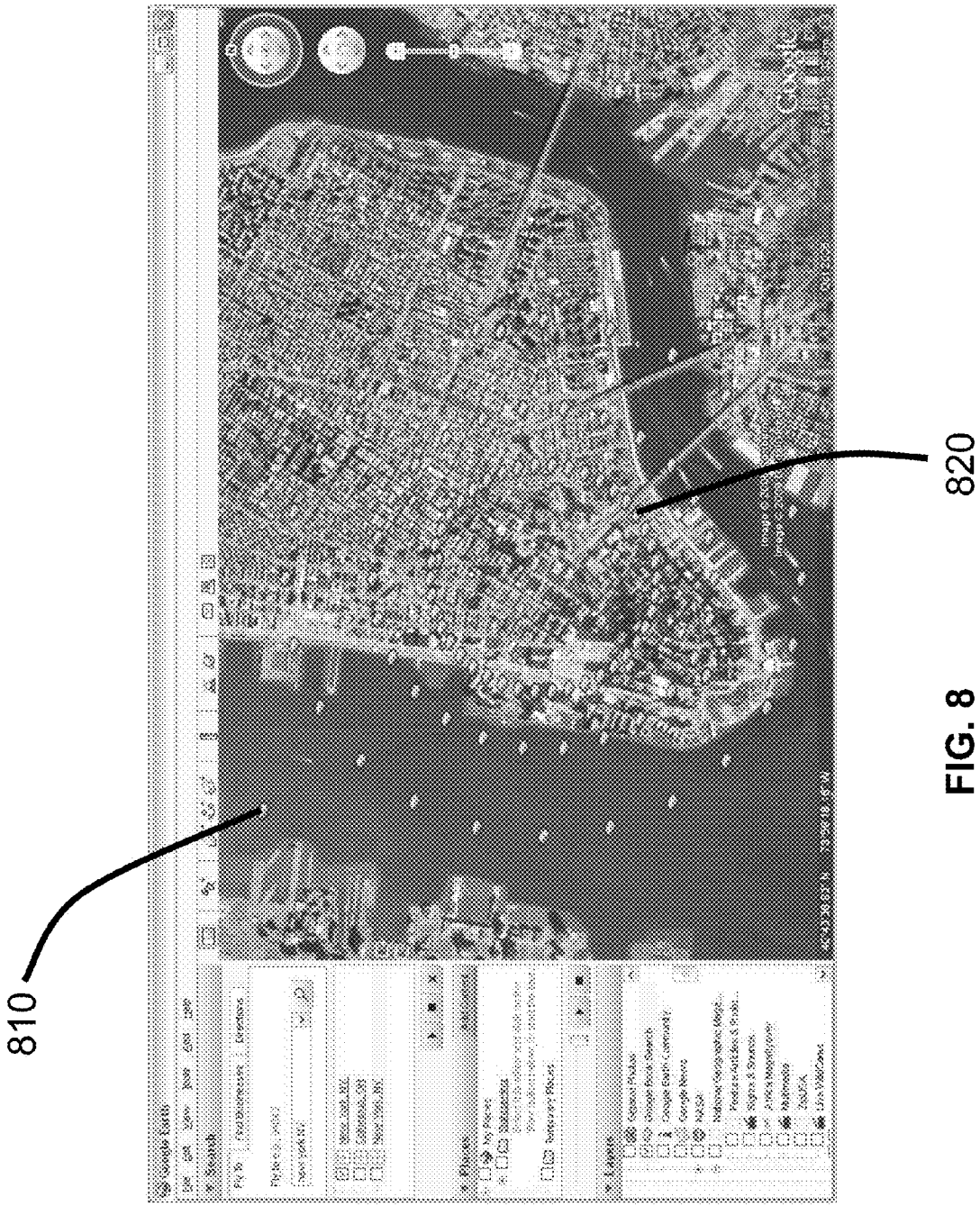
FIG. 8 illustrates the presentation of a map, where the map has been modified to include multiple references to a particular location, according to an embodiment of the invention.

Note also that there may be more than one data element referring to a single location. In such a case, this may result in a plurality of icons that are embedded in a map, where all the icons are associated with a particular location. In an embodiment of the invention, the icons can be placed in a circle surrounding the location of interest. This is illustrated in FIG. 8. Here a single icon 810 is shown in relation to a first location, while a set of icons 820 is shown in relation to a second location. The set of icons 820 is shown encircling the second location.

The present invention may be implemented using hardware, software or a combination thereof and may be implemented in a computer system or other processing system. The hardware, software or the combination can embody any of the components in FIG. 1 and/or any stage in FIGS. 2-5. In an embodiment, the invention is directed toward a computer program product executing on a computer system capable of carrying out the functionality described herein. This applies to any of the servers and/or clients in system 100. An example of a computer system 900 is shown in FIG. 9. Computer system 900 includes one or more processors, such as processor 904. Processor 904 is connected to a communication bus 906. Various software embodiments are described in terms of this example computer system. After reading this description, it will become apparent to a person skilled in the relevant art how to implement the invention using other computer systems and/or computer architectures.

Computer system 900 also includes a main memory 908, preferably random access memory (RAM), and may also include a secondary memory 910. Secondary memory 910 may include, for example, a hard disk drive 912 and/or a removable storage drive 914, representing a floppy disk drive, a magnetic tape drive, an optical disk drive, etc. Removable storage drive 914 reads from and/or writes to a removable storage unit 918 in a well-known manner. Removable storage unit 918, represents magnetic tape, optical disk, memory card, etc. which is read by and written to by removable storage drive 914. As will be appreciated, removable storage unit 918 includes a computer usable storage medium having stored therein computer software and/or data.

In alternative embodiments, secondary memory 910 may include other similar means for allowing computer programs or other instructions to be loaded into computer system 900. Such means may include, for example, a removable storage unit 922 and an interface 920. Examples of such may include a removable memory chip (such as an EPROM, or PROM) and associated socket, and other removable storage units 922 and interfaces 920 which allow software and data to be transferred from removable storage unit 922 to computer system 900.

Computer system 900 may also include a communication interface 924. Communication interface 924 enables computer system 900 to communicate with external and/or remote devices. For example, communication interface 924 allows software and data to be transferred between computer system 900 and external devices. Communication interface 924 also allows computer system 900 to communicate over communication networks, such as LANs, WANs, the Internet, etc. Communication interface 924 may interface with remote sites or networks via wired or wireless connections. Examples of communications interface 924 may include a modem, a network interface (such as an Ethernet card), a communications port, a PCMCIA slot and card, etc. Computer system 900 receives data and/or computer program products via communication interface 924. Software and data transferred via communications interface 924 are in the form of signals 928 which may be electronic, electromagnetic, optical or other signals capable of being received by communications interface 924. Signals 928 are provided to communications interface 924 via a communications path (i.e., channel) 926. This channel 926 carries signals 928 and may be implemented using wire or cable, fiber optics, a phone line, a cellular phone link, an RF link and other wired or wireless communications channels. In an embodiment of the invention, dataset analysis processor 115 can be implemented as a computer system such as system 900. Here, geocode information 140, metadata 145, and/or geo-annotations 135 can be received in the form of signals 928 via communications interface 924. The outputs of dataset analysis processor 115, such as modification command 150 or data 155, can be sent out via interface 924 or a similar interface.

In this document, the terms "computer program medium" and "computer usable medium" are used to generally refer to media such as removable storage drive 914, and a hard disk installed in hard disk drive 912. These computer program products are means for providing software to computer system 900.

Computer programs (also called computer control logic) are stored in main memory 908 and/or secondary memory 910. Computer programs may also be received via signal 928 and communications interface 924. Such computer programs, when executed, enable computer system 900 to perform the features of the present invention as discussed herein. In particular, the computer programs, when executed, enable processor 904 to perform the features of the present invention. Accordingly, such computer programs represent controllers of computer system 900.

In an embodiment where the invention is implemented using software, the software may be stored in a computer program product and loaded into computer system 900 using removable storage drive 914, hard disk drive 912 or communications interface 924. The control logic (software), when executed by processor 904, causes processor 904 to perform the functions of the invention as described herein.

Computer system 900 also includes input/output/display devices 930, such as monitors, keyboards, pointing devices, etc.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of modifying a map, comprising:
searching, using a processor, a data element for user generated text that includes one or more apparent textual geo-annotations associated with the data element and input by a user indicating a location of interest;
searching, by the processor, the data element for geocode information specifying a geographic location of the data element;
determining, by the processor, a location proximity of (i) a geographic location for each of the one or more apparent geo-annotations to (ii) the geographic location of the geocode information of the data element;
calculating, using the processor, a level-of-detail score for the data element based on the apparent geo-annotations in the user generated text and the location proximity of (i) the geographic location for each of the one or more apparent geo-annotations to (ii) the geographic location of the geocode information of the data element, wherein the level-of-detail score is a score corresponding to a geographic level of detail associated with the data element;
determining that the score exceeds a threshold level-of-detail score,
and in response, modifying the map to include a reference to the data element, wherein the reference is placed on a the map at a location corresponding to the data element; and
storing the modified map including the reference to the data element in a memory device for subsequent presentation.

2. The method of claim 1, wherein the data element includes at least one of a video file, a photograph, and text.

3. The method of claim 1, wherein the method further comprises:
searching the data element for geocode information, wherein the calculating of the level-of-detail score is further based on the geocode information.

4. The method of claim 1, wherein the method further comprises:
searching, using the processor, for metadata in the data element, wherein the calculating of the level-of-detail score is further based on the metadata.

5. The method of claim 4, wherein the metadata includes information regarding at least one of:
a number of times that at least a portion of the data element has been viewed;
a user rating of at least a portion of the data element; and
a page rank of at least a portion of the data element.

6. The method of claim 1, wherein the method further comprises:
filtering the apparent geo-annotations and eliminating non-geographical annotations.

7. The method of claim 6, further comprising:
after the eliminating, making any remaining geo-annotations available for the level-of-detail score calculating.

8. The method of claim 1, wherein calculating the level-of-detail score is a function of at least one of:
mentions of a place name;
a number of page views;
a user-provided rating;
a black list of locations;
a white list of locations;

a number of user comments;
a number of characters in a title or description; and
a date when content of the data element was uploaded.

9. A system for modifying a map, comprising:
a processor; and
a memory in communication with the processor and configured to store one or more programs to be executed by the processor, the one or more programs comprising instructions for:
searching a data element for user generated text that includes one or more apparent textual geo-annotations associated with the data element and input by a user indicating a location of interest;
searching the data element for geocode information specifying a geographic location of the data element;
determining a location proximity of (i) a geographic location for each of the one or more apparent geo-annotations to (ii) the geographic location of the geocode information of the data element;
calculating a level-of-detail score for the data element based on the apparent geo-annotations in the user generated text and the location proximity of (i) the geographic location for each of the one or more apparent geo-annotations to (ii) the geographic location of the geocode information of the data element, wherein the level-of-detail score is a score corresponding to a geographic level of detail associated with the data element;
determining that the score exceeds a threshold level-of-detail score, and in response initiate modification of the map to include a reference to the data element, wherein the reference is placed on the map at a location corresponding to the data element; and
storing the modified map including the reference to the data element.

10. The system of claim 9, wherein the data element includes at least one of a video file, a photograph, and text.

11. The system of claim 9, wherein the instructions further comprise:
searching the data element for geocode information, wherein the calculating of the level-of-detail score is further based on the geocode information.

12. The system of claim 9, wherein the instructions further comprise:
searching for metadata in the data element,
wherein calculating of the level-of-detail score is further based on the metadata.

13. The system of claim 12, wherein the metadata includes information regarding at least one of:
a number of times that at least a portion of the data element has been viewed;
a user rating of at least a portion of the data element; and
a page rank of at least a portion of the data element.

14. The system of claim 9, wherein the instructions further comprise:
filtering the apparent geo-annotations and eliminating non-geographical annotations.

15. The system of claim 14, wherein after eliminating, making any remaining geo-annotations available for the calculating the level-of-detail score.

16. The system of claim 9, wherein calculating the level-of-detail score is based as a function of at least one of:
mentions of a place name;
a number of pages views;
a user-provided rating;
a black list of locations;
a white list of locations;
a number of user comments;
a number of characters in a title or description; and
a date when content of the data element was uploaded.

17. A non-transitory computer readable storage medium storing one or more programs configured for execution by a computer, the one or more programs comprising instructions for:
searching a data element for user generated text that includes one or more apparent textual geo-annotations associated with the data element and input by a user indicating a location of interest;
searching the data element for geocode information specifying a geographic location of the data element;
determining a location proximity of (i) a geographic location for each of the one or more apparent geo-annotations to (ii) the geographic location of the geocode information of the data element;
calculating a level-of-detail score for the data element based on the apparent geo-annotations in the user generated text and the location proximity of (i) the geographic location for each of the one or more apparent geo-annotations to (ii) the geographic location of the geocode information of the data element, wherein the level-of-detail score is a score corresponding to a geographic level of detail associated with the data element;
determining that the score exceeds a threshold level-of-detail score, and in response initiating modification of the map to include a reference to the data element, wherein the reference is placed on the map at a location corresponding to the data element; and
storing the modified map including the reference to the data element in a memory device for subsequent presentation.

18. The non-transitory computer readable storage medium of claim 17, wherein the data element includes at least one of a video file, a photograph, and text.

19. The non-transitory computer readable storage medium of claim 17, further comprising:
searching the data element for geocode information,
wherein the calculating of the level-of-detail score is further based on the geocode information.

20. The non-transitory computer readable storage medium of claim 17, further comprising:
searching for metadata in the data element,
wherein the calculating of the level-of-detail score is further based on said metadata.

21. The non-transitory computer readable storage medium of claim 20, wherein the metadata includes information regarding at least one of:
a number of times that at least a portion of the data element has been viewed;
a user rating of at least a portion of the data element; and
a page rank of at least a portion of the data element.

22. The non-transitory computer readable storage medium of claim 17, further comprising:
filtering the apparent geo-annotations and eliminate non-geographical annotations.

23. The non-transitory computer readable storage medium of claim 22, wherein after eliminating
making any remaining geo-annotations available for the level-of-detail score calculation.

24. The non-transitory computer readable storage medium of claim 17, calculating the level-of-detail score is based as a function of at least one of:
mentions of a place name;
a number of page views;
a user-provided rating;

a black list of locations;
a white list of locations;
a number of user comments;
a number of characters in a title or description; and
a date when content of the data element was uploaded.

* * * * *